United States Patent [19]

Matsuzaki

[11] 3,885,168

[45] May 20, 1975

[54] PEAK DETECTOR

[75] Inventor: Atsushi Matsuzaki, Yokohama, Japan

[73] Assignee: Sony Corporation, Tokyc, Japan

[22] Filed: Dec. 26, 1973

[21] Appl. No.: 427,567

[30] Foreign Application Priority Data

Dec. 26, 1973 Japan .............................. 48-836[U]

[52] U.S. Cl. .......... 307/235 A; 307/293; 307/233 R; 328/140; 328/150

[51] Int. Cl. ........................... H03k 5/18; H03k 5/20

[58] Field of Search .... 307/235 R, 293, 294, 233 R, 307/235 A; 330/141; 328/140, 143, 150

[56] References Cited

UNITED STATES PATENTS

| | | | |
|---|---|---|---|
| 3,535,658 | 10/1970 | Webb | 307/233 X |
| 3,617,777 | 11/1971 | Kudelski | 307/293 |

*Primary Examiner*—John Zazworsky

*Attorney, Agent, or Firm*—Lewis H. Eslinger; Alvin Sinderbrand

[57] ABSTRACT

A first rectifying circuit has a relatively low time constant output circuit. A pulsating input voltage therefore produces an output voltage that also includes pulsations of the same periodicity. The output voltage varies in amplitude during each cycle from a peak value to a lower value. A second rectifying circuit with a larger time constant is energized by an attenuated replica of the pulsating input voltage and controls the circuit output voltage. If, due to changes in the rate or amplitude of the pulsations in the input voltage, the output voltage of the first rectifying circuit, drops below the normally lower output voltage of the second rectifying circuit, a unidirectionally conductive device transfers charge from the larger time constant circuit to the lower time constant circuit to allow the circuit output voltage to shift quickly to a lower value.

4 Claims, 10 Drawing Figures

PEAK DETECTOR

BACKGROUND OF THE INVENTION

1. Field Of The Invention

This invention relates to a circuit having a relatively long time constant but with overriding means to shift the output voltage quickly when the input signal shifts from one relatively constant value to another. In particular, the invention relates to a detector circuit used in a tape drive control system and includes means to shift the output voltage of the circuit relatively quickly when the tape speed changes relatively quickly from one value to another.

2. The Prior Art

Tape apparatus of high quality includes a capstan that moves the tape past a recording or playback head at a constant speed. The apparatus includes a take-up reel and a drive shaft therefor, and a supply reel with a drive shaft and braking means for adjusting the back tension on the tape. The apparatus for controlling the back tension includes a generator that generates an alternating voltage that is synchronous with the rotation of the supply reel shaft. This voltage is modified by, for example, changing the alternating voltage into a sawtooth wave, the peak value of which is a linear function of the duration of each cycle of the alternating voltage. This peak value is measured and is used to control the braking device so that a fixed amount of tension will be applied to the tape even though the speed of the supply shaft changes as tape is transferred from the supply reel to the take-up reel.

Normally, the change in speed is quite slow, and the circuit that measures the value of the sawtooth wave can have a long time constant so that the output voltage will be quite smooth. However, there are occasions when the speed of movement of the tape changes quickly to a higher value. In that case, the peak value of the sawtooth wave drops suddenly due to the fact that the sawtooth voltage does not have time to rise to its previous peak value within the shorter period of the cycle of increased frequency. As a result, the back tension is not properly controlled until the output voltage of the long time constant circuit gradually reduces to the proper new value.

It is one of the objects of the present invention to provide a circuit that has a basic long time constant but includes means to override the operation of the time constant to shift the output voltage relatively quickly in response to a sudden change in the peak value of the input voltage.

Another object is to provide an improved detector circuit with a long time constant output circuit and a short time constant output circuit and means to override the operation of the long time constant circuit in response to a sudden change in the peak value of the input voltage signal.

Further objects will be apparent from studying this specification together with the accompanying drawings.

SUMMARY OF THE INVENTION

In accordance with the present invention a sawtooth signal is applied to a detector circuit that includes two rectifying sections. The first rectifying section has a time constant with a predetermined value. The other rectifying section is connected to receive an attenuated amount of the sawtooth signal and has a time constant of larger value than that of the first rectifying section. The circuit also includes means rendered conductive when the output signal across the first time constant circuit drops below that of the larger time constant circuit. Such means may include the base-collector circuit of a transistor, the base of which is connected to the longer time constant circuit and the collector of which is connected to the short constant circuit. The output signal of the circuit is obtained from the emitter of the transistor.

DETAILED DESCRIPTION OF THE INVENTION

Figure 1:
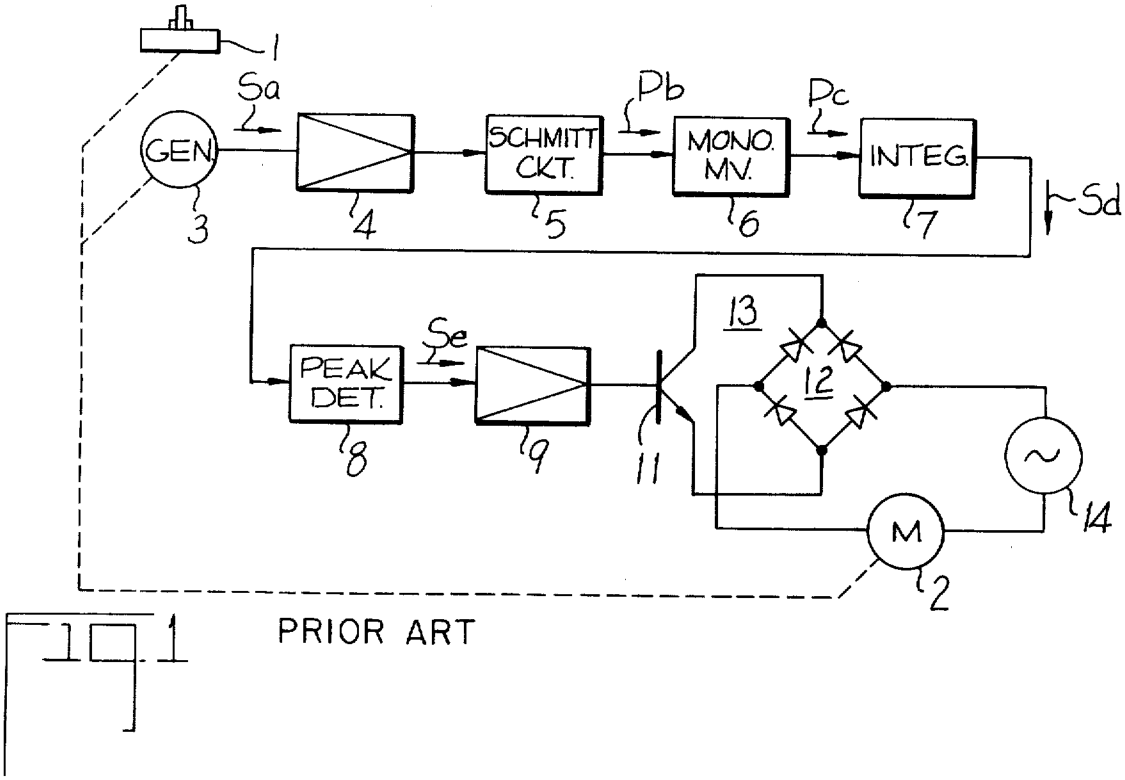
FIG. 1 PRIOR ART
FIG. 1 is a diagram, principally in block form, of a prior art back tension control for a tape recorder.

In the apparatus shown in FIG. 1, a tape supply reel drive shaft 1 is mechanically connected to braking means 2 and to a generator 3, as indicated by the broken lines interconnecting these components. The generator 3 supplies an alternating voltage signal to an amplifier 4 which in turn passes this signal to a Schmitt-trigger circuit 5. The output of this circuit 5 is applied to a monostable multivibrator 6, and the output of the multivibrator 6 is applied to an integrating circuit 7. The latter circuit produces a sawtooth wave, the pulsations of which have the same periodicity as the alternating voltage signals from the generator 3. The output of the integrating circuit 7 is connected to a peak detector 8, which, in turn, is connected by way of an amplifier 9 to the input circuit of a transistor 11. The emitter-collector circuit of the transistor 11 is conductively connected to a bridge rectifier 12 to form a variable impedance circuit 13 operated by alternating current from a source 14.

Figures 2A, 2B, 2C, 2D, 2E, 2F, 2G:
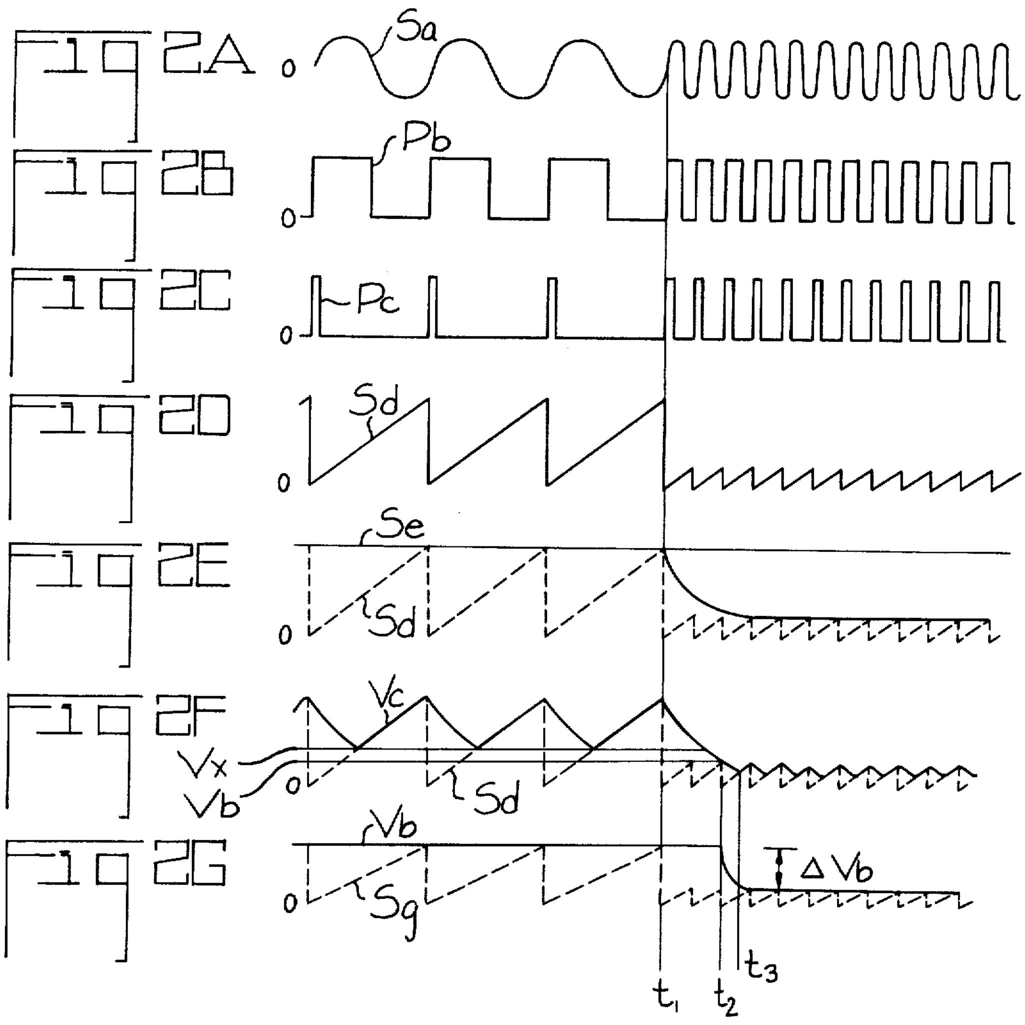
FIGS. 2A-2G are waveforms experienced in the operation of back tension control circuits and are illustrative of the difference between back tension control circuits of the prior art and improved circuits according to the present invention.

The operation of the circuit in FIG. 1 will be described in conjunction with the waveform diagrams in FIGS. 2A–2E. As the supply reel shaft 1 rotates, it causes the generator 3 to generate an alternating voltage signal Sa as shown in FIG. 2A. It will be noted that this signal appears to have two frequencies, one much higher than the other. The waveform of the signal Sa is drawn that way for the sake of clarity of description of the invention. The signal Sa in the left-hand part of FIG. 2A represents movement of the tape at a speed of 9.5cm per second and the right-hand part represents movement of the tape at a speed of 19cm per second.

The alternating voltage Sa is amplified by the amplifier 4 and is applied to the Schmitt-trigger circuit 5 which generates a pulse signal Pb as shown in FIG. 2B. This pulse signal is actually a square wave with a duty cycle of 50 percent, no matter whether the frequency of the signal Sa corresponds to 9.5cm per second or 19cm per second. When the square wave signal Pb from the Schmitt-trigger circuit 5 is applied to the monostable multivibrator 6, it causes the multivibrator to generate a pulse signal Pc as shown in FIG. 2C in which the duty cycle is much less than 50 percent and is low enough so that, no matter what the speed of the tape, each of the pulses Pc will have the same width.

The pulses Pc are applied to the integrating circuit 7 which generates a voltage that increases linearly with time but is brought back to a fixed level at the occurrence of each of the pulses Pc. Thus, the linearly increasing voltage is a sawtooth wave Sd, as shown in FIG. 2D, and since the rate of increase of the voltage in the sawtooth wave is constant, the peak value reached by this voltage is a linear function of the period of the alternating voltage generated by the generator 3. When the period is long, as in the left-hand part of the signal Sa shown in FIG. 2A, the peak value of the sawtooth wave Sd shown in FIG. 2D is high. When the period of the signal Sa is short, as in the right-hand section of the signal shown in FIG. 2A, the peak value of the sawtooth signal Sd shown in FIG. 2D is low.

The peak value of the sawtooth signal Sd is measured by the peak detector 8 to produce the signal Se shown in FIG. 2E. The signal Se is illustrated by a solid line, and as may be seen, the left-hand portion of it follows the peaks of the relatively large sawtooth waves that correspond to the lefthand part of the signal Sd. At the far right-hand end of the signal shown in FIG. 2E, the value of Se is also at the level of the peaks of the smaller sawtooth waves, but between the left and right-hand ends there is a section in which the signal Se does not correspond to the peak values of the suddenly diminished sawtooth waves.

The signal Se is amplified by the amplifier 9 and is applied to the base of the transistor 11, which controls the amount of current allowed to pass through the bridge rectifier 12 and the braking means 2 from the alternating current source 14. If the transistor 11 is nonconductive, no current can pass through the braking means 2 but if the transistor 11 is highly conductive a relatively high current can pass through the braking means. The tension in the tape is controlled by the amount of current through the braking means, and if the speed of the tape is constant, or almost so, the current through the braking means 2 should also be constant to the same degree. If the tape speed shifts suddenly from one value to another, the current through the braking means 2 should also shift suddenly, but since the braking means is controlled by the signal Se shown in FIG. 2E, it will be observed that it cannot shift as quickly as is desired when the speed of the tape is suddenly increased.

Figure 3:
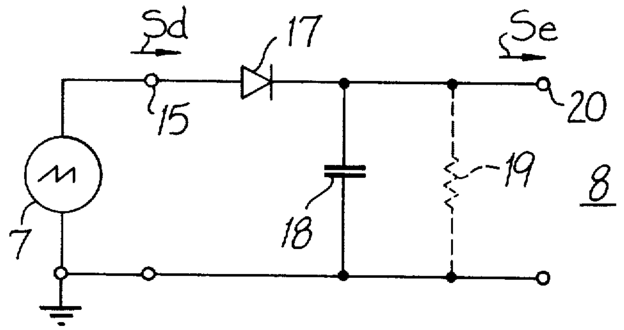
FIG. 3 is a schematic circuit diagram of a peak detector as used in the prior art back tension control circuit of FIG. 1.

FIG. 3 shows a conventional peak detector 8 of the type used in the circuit in FIG. 1 and having an input terminal 15 connected to the output of the integrator 7. The peak detector has a rectifier 17 and a capacitor 18 connected in series between the input terminal 15 and the common ground terminal. A resistor 19 of high resistance is shown in dotted lines to indicate that it may be simply the inherent loss, for example, due to surface resistance, rather than a physical resistor. An output terminal 20 is connected to the common circuit point of the diode 17 and the capacitor 18.

When the circuit in FIG. 3 is in operation, the capacitor 18 charges to the peak level of the sawtooth wave signal Sd. The time constant of the capacitor 18 and the very high resistance resistor 19 is such that the charge across the capacitor remains almost constant from one sawtooth voltage peak to the next. It is this type of operation that prevents the conventional peak detector shown in FIG. 3 from responding quickly to sudden changes in the speed of movement of the tape.

In regard to the voltage across the capacitor 18, the waveform Se shown in FIG. 2E is somewhat idealized. There would actually be some downward slope to the line Se following each peak of the sawtooth wave. On the other hand, when the speed of movement of the tape is suddenly shifted so that the small amplitude sawtooth waves of the right-hand section are applied to the peak detector, the discharge curve of the voltage Se would not be as steep as is shown. The desirability of having little ripple, or variation in the amplitude of the signal Se from one peak to the next, is not consistent with the desirability of changing the level of the voltage Se quickly in response to the quick change in the speed of movement of the tape.

Figure 4:
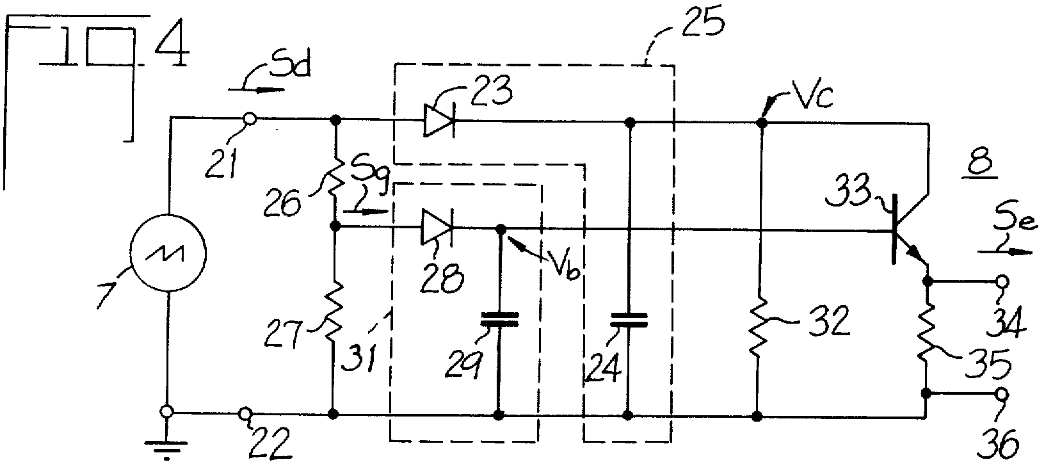
PRIOR ART FIG. 4
FIG. 4 is a schematic circuit diagram of an improved detector circuit according to the present invention.

FIG. 4 shows an improved circuit according to the present invention. In FIG. 4 the output of the integrator circuit 7 is connected across the input terminals 21 and 22 of the improved circuit. The terminal 22 is connected to ground. A first rectifier 23 is connected in series with a capacitor 24 across the terminals 21 and 22 to form a first rectifying circuit 25. A voltage divider comprising two resistors 26 and 27 is also connected across the input terminals 21 and 22 and at the common circuit point between these two resistors there is connected a second rectifier 28. The second rectifier is connected in series with a second capacitor 29 across the resistor 27 to form a second rectifier circuit 31.

A resistor 32 is connected in parallel with the capacitor 24 and the time constant of this resistor-capacitor combination has a relatively low value as compared with the time constant of the prior art circuit shown in FIG. 3. The collector of a transistor 33 is connected to the common circuit point between the rectifier 23 and the capacitor 24, and the base of this transistor is connected to the common circuit point between the rectifier 28 and capacitor 29. The emitter of the transistor is connected to an output terminal 34 and to one end of an emitter load resistor 35, the other end of which is connected to an output terminal 36 that is directly connected to the grounded terminal 22.

In the operation of the circuit in FIG. 4 it will be understood that the waveforms shown in FIGS. 2A–2D are applicable. The impedance of the resistor 32 is such that it discharges the capacitor 24 noticeably during the interval between successive peaks of the sawtooth wave signal Sd applied by the integrator circuit 7, as shown in FIG. 2F. The voltage at the output of the rectifier 25 is indicated by the solid line Vc and includes an exponential decay portion that starts with each of the sawtooth peaks and diminishes until it intersects the rising portion of the next sawtooth wave Sd. The level of this intersection is indicated by the voltage Vx.

FIG. 2G shows, in dotted form, the sawtooth waves Sg applied to the rectifier circuit 31. These sawtooth waves are simply attenuated replicas of the sawtooth waves Sd applied to the rectifier circuit 25. The discharge path of the capacitor 29 in the second rectifier circuit 31 normally has a very high impedance so that the voltage Vb across the capacitor remains substantially constant at the peak level of the sawtooth wave Sg. This voltage Vb is applied to the base of the transistor 33 and, as is indicated in FIG. 2F, is somewhat less than the level Vx, which is the lowest level normally reached by the voltage across the capacitor 24 from one cycle to the next.

At the time $t_1$, it is assumed that the speed of movement of the tape suddenly increases from, for example, 9.5 cm per second to 19 cm per second. As has been described previously, this causes the integrator circuit 7 to produce sawtooth waves having much lower peak values than those corresponding to the relatively slow speed movement of the tape. Initially, the voltage across the capacitor 24 simply decreases according to its regular exponential curve, but because it does not intersect the next rising sawtooth wave at the level $Vx$, it passes through that level and reaches the level $Vb$, as shown in FIG. 2F. When this occurs, the voltage applied to the collector of the transistor 33 is equal to the voltage applied to the base. As the capacitor 24 continues to discharge, the PN junction between the base and collector of the transistor 33 becomes forward biased, which means that it presents a low impedance from the upper terminal of the capacitor 29 to the upper terminal of the capacitor 24 and the resistor 32. This low impedance path effectively places the capacitor 24 and the resistor 32 in parallel with the capacitor 29 and permits charge to be transferred from the capacitor 29 to the capacitor 24 and to be discharged through the resistor 32. As a result, the capacitor 29 is no longer part of a large time constant circuit but is connected to a relatively low impedance beginning at the time $t_2$ when the discharge voltage curve causes the voltage $Vc$ to be equal to the voltage $Vb$. The sudden connection of the relatively low impedance circuit to the capacitor 29 permits the voltage $Vb$ shown in FIG. 2G to drop by an amount $\Delta Vb$, which is the difference between the peaks of the signal $Sg$ corresponding to slow speed movement of the tape and the peaks $Sg$ corresponding to high speed movement. When the voltage $Vb$ drops in this fashion, the PN junction between the base and collector of the transistor 33 is no longer forward biased and so the low impedance discharge for the capacitor 29 is, in effect, disconnected. As may be seen, there is some time lag between the time $t_1$ when the speed of movement of the tapes suddenly shifts and the time $t_3$ when the circuit again stabilizes its operation in accordance with the new speed, but this time lag is substantially shorter than would be possible with a fixed, large time constant discharge circuit of the type shown in the prior art circuit of FIG. 3.

What is claimed is:

1. A circuit to respond to peak values of an applied pulsating voltage, said circuit comprising:

A. a first rectifier;

B. a first time constant circuit connected in series with said first rectifier to receive the pulsating voltage;

C. a second rectifier;

D. a second time constant circuit having a larger time constant than said first time constant circuit and being connected in series with said second rectifier to a source of a lower amplitude of said voltage; and E. a transistor having a collector electrode connected to said first time constant circuit and a base electrode connected to said second time constant circuit for connecting said second time constant circuit to said first time constant circuit via the collector-base circuit of said transistor said transistor further including an emitter electrode connected to an output terminal and being further connected through an emitter impedance such that said transistor is operable as an emitter-follower.

2. The circuit of claim 1, in which the time constant of said second time constant circuit maintains the voltage thereacross substantially constant when the voltage across said first time constant circuit is higher than said voltage across said second time constant circuit.

3. The circuit of claim 1, in which the time constant of said first time constant circuit is low enough to permit substantial variation of voltage thereacross between pulsations of the applied voltage.

4. The circuit of claim 1, in which said source of lower amplitude of said voltage comprises a voltage divider connected across input terminals of said first rectifier and time constant circuit.

* * * * *